Jan. 12, 1943.   T. W. MEEDER   2,308,095
HEADLIGHT TESTER
Filed April 7, 1941   2 Sheets-Sheet 1

Inventor
Thomas W. Meeder
By Blackmore, Spencer & Flint
Attorneys

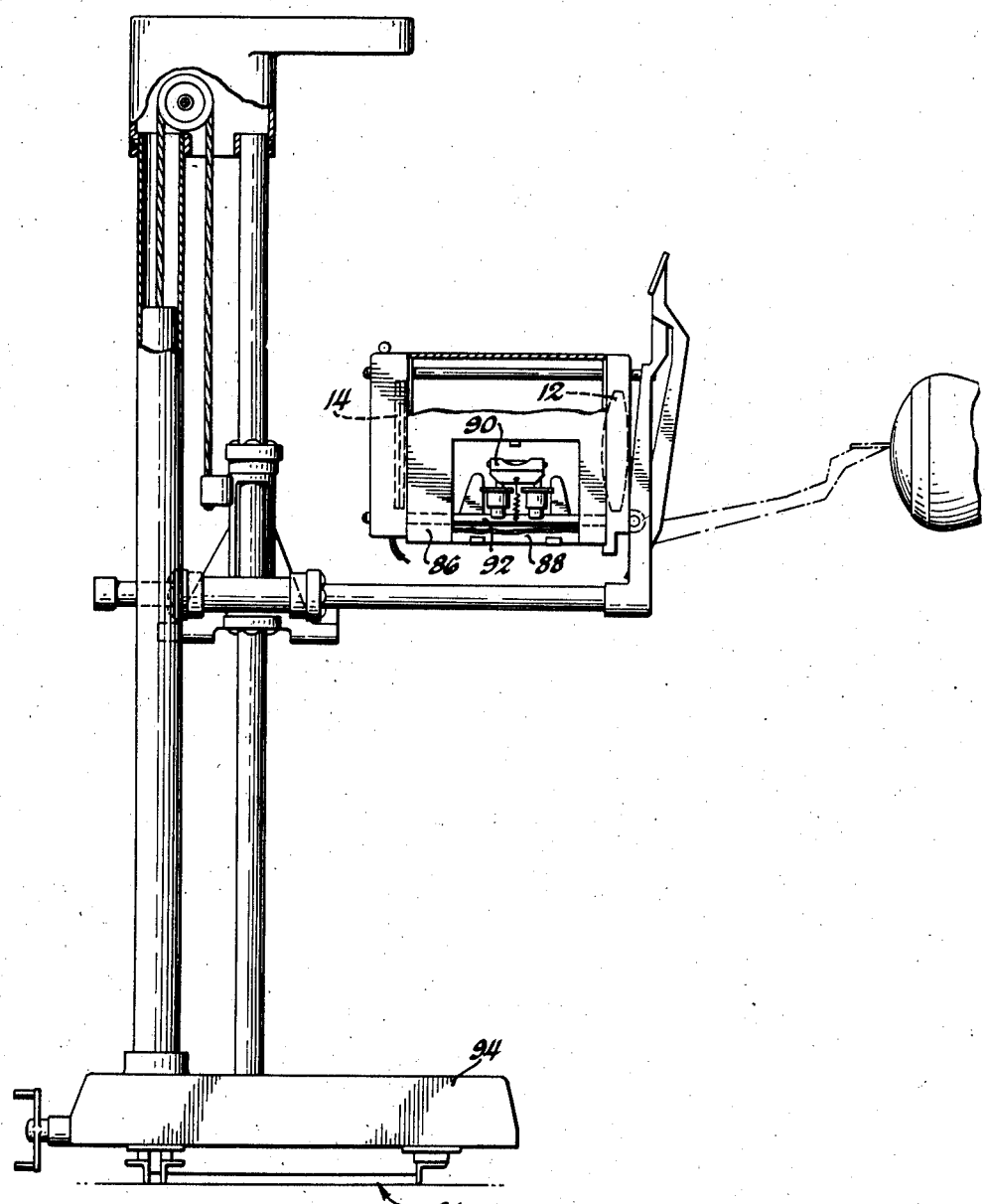

Patented Jan. 12, 1943

2,308,095

UNITED STATES PATENT OFFICE 2,308,095

HEADLIGHT TESTER

Thomas W. Meeder, Indianapolis, Ind., assignor to General Motors Corporation, Detroit, Mich., a corporation of Delaware Application April 7, 1941, Serial No. 387,154

5 Claims. (Cl. 88—14)

My invention relates to a headlight tester using photoelectric cells to enable setting or aiming of the headlights and measuring the total illumination.

An object of my invention is to provide a device for aiming and testing headlights which is easily operated and which eliminates errors introduced through the exercise of human judgment.

In conventional headlight testers it is customary to provide for projection of the beam on a large screen at some distance from the car or to project a miniature of the beam, obtained by the use of a condensing lens or mirror, on a small screen a short distance from the headlamp. In either case the operator determines whether the lamp is properly aimed by observing the orientation of the beam pattern with respect to reference lines on the screen, and determines whether the beam is properly focused by examining the distribution of light in the beam pattern. Beam patterns do not have sharp boundary lines and the light intensity changes gradually from one part of the beam to another. Consequently the testing of aim and focus of the headlamp depends on individual perception and varies considerably with individuals. It is an object of my invention to so arrange a photoelectric cell or cells with respect to the headlamp beam and to provide suitable circuits so that aiming and focusing may be determined by measurement of light intensities by the cells instead of relying on individual judgment as to the appearance and orientation of the beam pattern, and to do this in such a manner that a simple, inexpensive and flexible test equipment is provided.

Another object of my invention is to provide a device for aiming headlamps which can be easily and inexpensively manufactured, as by taking a single metal plate coated with a photosensitive substance, and making a plurality of separate photosensitive cells having the metal plate as a common terminal.

For further objects of the invention reference should be had to the accompanying specification and claims and to the drawings annexed hereto.

Fig. 1 of the drawings shows a testing device embodying my invention.

Fig. 5 is a diagrammatic side view of the testing device mounted on a support adjacent an automobile headlamp.

Figure 1:
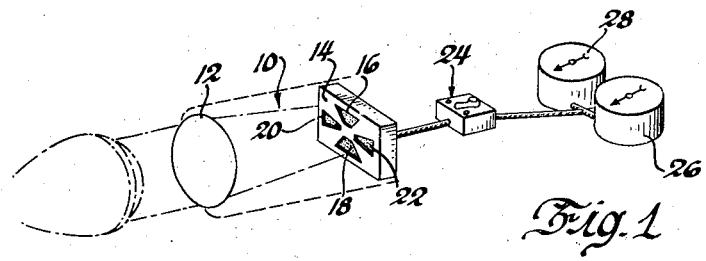
Figure 2:
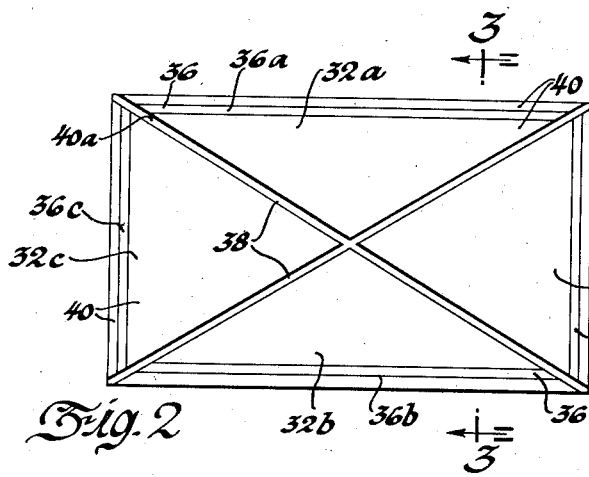
Fig. 2 is a view in elevation showing the light receiving face presented by the photoelectric cells.
Figure 3:
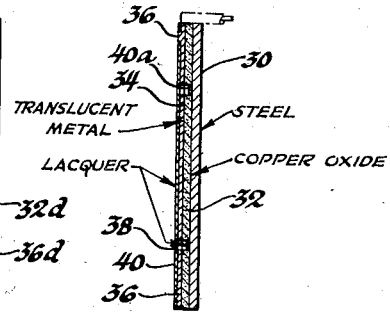
Fig. 3 is a view in section on the line 3—3 of Fig. 2.

In Fig. 1 the lens and photocell assembly is indicated generally by 10. This assembly is contained in a housing of any suitable form. At the forward end of this housing is mounted a condensing lens 12, which throws an image onto the photosensitive cells mounted at the rear of the housing. The image from the lens may fall directly on the cells, or I may interpose a screen 14 of any suitable light impervious material having openings therein as indicated by 16, 18, 20 and 22. I have found that best results are obtained by having the image slightly out of focus at the point where it falls upon the cells. The distance from the focal point need not be great, nor is it critical; just enough out of focus to diffuse the image will suffice. A switch assembly shown at 24 is used to make the necessary connections between the photoelectric cells and meters 26 and 28. If screen 14 is used, it is mounted directly ahead of the photoelectric cells, which are shown in detail in Figs. 2 and 3.

As will be understood by those skilled in the art, the term "photoelectric cell" is a broad one. Of the many types in use, the "photoelectric tube" or "photoemissive tube" requires an external voltage or energy source, because the light sensitive substance, usually formed from one of the alkali metals, does not generate a voltage, but merely varies the current in the circuit generated by the external source. However, the "barrier layer" type of photoelectric cell is "photovoltaic," i. e., it does generate a voltage the magnitude of which depends upon the intensity of the light falling on the sensitive surface. Selenium and copper are two metals rather widely used in forming barrier layer cells. I prefer to use cells of the barrier layer type. This preferred type comprises a metallic plate 30, such as steel, having a layer 32 of a suitable substance, such as selenium or copper oxide. The metallic plate may be of any desired contour; the one shown in the drawings is rectangular. For maximum efficiency I may coat the barrier layer with a translucent metal sheet 34. This metal sheet has a raised portion 36 near its periphery. Diagonal cuts are then made down to the metallic plate, forming grooves 38. A moisture proof coating 40 of any suitable material, such as a lacquer, is then sprayed over the face of the assembly. It should be noted that this lacquer preferably also finds its way to the bottoms of the grooves as shown at 40a. The spraying is done in any manner which serves to keep the raised portions 36 uncovered. This may be done by having a mask over the raised portion during spraying, or these portions can be coated by the spraying operation and can then be scraped or washed clean.

The cutting operation serves to separate the barrier layer into four separate sections, in effect comprising four photoelectric cells 32a, 32b, 32c and 32d, having a common terminal 30 of one polarity in the form of the aforesaid metal backing plate, and separate terminals of the opposite polarity in the form of the raised marginal portions 36a, 36b, 36c and 36d. The lacquer 40a at the bottoms of the grooves 38 insures against short circuiting between adjacent sections by moisture which might collect at the bottoms of these grooves.

Figure 4:
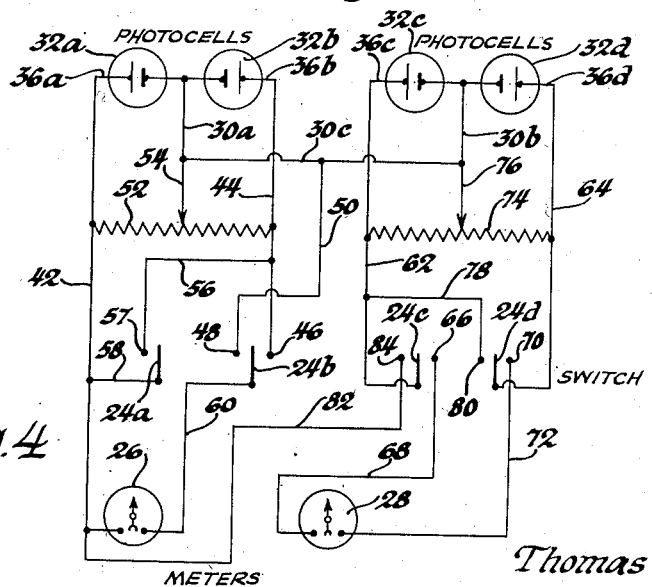
Fig. 4 is a circuit diagram showing the various elements of my invention in their electrical relation to each other.

In the circuit diagram of Fig. 4 the photoelectric cells are shown as having a common terminal represented by vertical lines 30a and 30b and horizontal line 30c. Terminal 36a of cell 32a is connected by a conductor 42 to meter 26. Switch 24 has four elements: 24a, 24b, 24c and 24d. Terminal 36b of cell 32b is connected by conductor 44 to contact 46 of switch element 24b. The other contact 48 of this switch element is joined to backing plate 30 by conductor 50. Terminals 36a and 36b of the two cells 32a and 32b are electrically connected by a potentiometer bridge or resistance 52. The common terminal 30a between cells 32a and 32b is connected to resistance 52 near its midpoint by a conductor and movable contactor, indicated by 54. A conductor 56 connects conductor 44 with contact 57 of switch element 24a. Switch element 24a is connected to the left side of meter 26 by conductors 58 and 42. Switch element 24b is connected to the right side of meter 26 by conductor 60.

Terminal 36c of photocell 32c is connected by a conductor 62 to switch element 24c. Terminal 36d of cell 32d is connected by conductor 64 to switch element 24d. Contact 66 of switch element 24c is connected to the left side of meter 28 by conductor 68, and contact 70 of switch element 24d is connected to the right side of meter 28 by conductor 72. A resistance bridge or potentiometer 74 similar to potentiometer 52 is connected across terminals 36c and 36d of cells 32c and 32d, respectively, by the conductors 62 and 64. The common terminal 30b between these two cells is connected to potentiometer 74 near its midpoint by a conductor and contactor indicated by 76. Conductor 78 connects conductor 62 with contact 80 of switch element 24d. Conductor 82 connects contact 84 of switch element 24c with the left side of meter 28.

Potentiometers 52 and 74 are provided for calibration purposes; with the four elements of switch 24 thrown to the right, terminal 36a of cell 32a is connected to the left side of meter 26 by conductor 42, and terminal 36b of cell 32b is connected to the right side of meter 26 through conductor 44, switch element 24b and conductor 60. If now two light beams having a predetermined desired ratio of intensities are made to impinge on cells 32a and 32b, meter 26 can be made to read zero by adjustment of contact 54 on potentiometer 52. After this adjustment or calibration has been made, any variation from zero of the hand of meter 26 indicates an unbalance in the circuits, which in turn indicates that the light beams incident on the two cells 32a and 32b do not have the desired ratio of intensities. Similarly, the circuits between cells 32c, 32d and meter 28 can be balanced with switch elements 24c and 24d in engagement with their right-hand contacts by adjustment of contactor 76 on potentiometer 74 while light beams having the desired ratio of intensities impinge upon cells 32c and 32d. During use of the device, as while aiming an automobile headlight, the light beams which impinge on the cells are, of course, really different parts of the same beam.

In many cases, the ratio of intensities discussed above will be unity. However, it might be desirable to have a ratio other than unity, as for example where the light beam is to be directed down rather than horizontal, or to the right rather than straight ahead. Even in this case, however, it may be desirable to calibrate the balanced circuits for light beams of equal intensities, and to secure any desired variation from the horizontal or straight ahead by giving the desired angle of inclination to the optical axis of the instrument.

It will be apparent to those skilled in the art that any suitable housing and support may be used for the device of my invention. I prefer to use an arrangement such as disclosed and claimed in Patent 2,176,214 to Robert N. Falge and George W. Onksen, Jr., or in Patent 2,176,215 to Robert N. Falge, both of said patents being assigned to the assignee of my invention. In those patents, a supporting frame carries a test head comprising a three part lens and a target, which could readily be adapted to carry my improvement comprising the single lens 12 and screen 14, respectively, as shown in Fig. 5, although I might prefer, in addition, to extend a light-tight substantially tubular covering or housing 86 between the lens frame and the target frame, mounting the meters outside this covering. The cover or housing 86 may be provided, if desired, with a suitable door 88 to provide access to the level 90 which is adjustably mounted on the rod 92 of the supporting framework. In the former of the two aforesaid patents, the supporting frame is adjustably mounted on upright parallel rods, which in turn are carried by a base mounted on casters to permit its ready movement anywhere on the floor. In the latter of these two patents, the base 94 is mounted on a short trackway 96, as shown in Fig. 5 of the accompanying drawings, which is set level into the floor. The stands or mounts disclosed in both of the aforesaid patents are equipped with sighting means for aligning the lens and target with given reference points on the vehicle.

No attempt is made herein to describe in detail the construction and operation of the support shown in Fig. 5 inasmuch as this support is fully described in the aforesaid Patent 2,176,215 to Robert N. Falge, and the support of Patent 2,176,214 to Robert N. Falge et al. could also be readily adapted to the testing device disclosed herein.

In operation, the test head is properly aimed by aligning sights provided on it with suitable reference points on the vehicle the lights of which are being tested. The head is then shifted into position in front of the headlamp while at the same time maintaining its axis parallel to the direction in which it has been aimed. The test head is now in position so that if the headlamp is properly aimed and focused light of predetermined relative intensity will fall on the cells. To accomplish this, of course, the cells must be calibrated as to sensitivity to set such a headlamp. I may find it desirable for this latter purpose to insert variable resistances (not shown) in the conductors 42, 44, 62 and 64. For best results, the apparatus is set up so as to locate lens 12 eighteen inches or less from the headlight lens, although obviously any other distance could be used by employing a lens having the proper characteristics for the desired distance.

With potentiometers 52 and 74 adjusted as described, it will be evident to those skilled in the art that I have provided a device which may readily be used for the purpose of aiming a beam of light, such as an automobile headlight. With the photocells in the position indicated in Fig. 2, a reading of meter 26 other than zero would indicate that the beam was too high or too low.

Appropriate notations could be marked on the meter scale if desired to indicate to the operator whether the beam was too high or too low. Similarly, cells 32c and 32d, and meter 28 combine to inform the operator of the device whether the beam is directed straight ahead, or to the right or left, and the scale of meter 28 may be calibrated accordingly.

My invention may also be used to measure the candlepower or total light values of all the sections, thus indicating the candlepower of the light being tested. The apparatus is put in condition for this operation by throwing the arm of switch 24 to the left, putting the various switch elements into engagement with their left-hand contacts, as viewed in Fig. 4. With the switch in this position, common terminal 30, represented by lines 30a, 30b and 30c in Figure 4, is connected to the right side of meter 26 through conductor 50, switch element 24b and conductor 60. Terminal 36a of cell 32a is connected to the left side of meter 26 by conductor 42; terminal 36b of cell 32b is connected to the left side of this meter by conductors 44 and 56, switch element 24a, and conductor 42; terminal 36c of cell 32c is likewise connected by way of conductor 62, switch element 24c, and conductor 82; and terminal 36d of cell 32d is so connected through conductor 64, switch element 24d, conductors 78 and 62, switch element 24c and conductor 82. Thus, all four sections are connected in such a manner to meter 26 as to cause that meter, appropriately calibrated, to register the candlepower of the light being tested.

With the light switch on, and with the elements of switch 24 thrown to the right as seen in Fig. 4, the headlight mounting is adjusted until meters 26 and 28 read zero. If a reading of the lamp candlepower is desired, the arm of switch 24 is thrown to the left, and the reading of meter 26 gives the candlepower output of the lamp.

Certain changes and modifications will be obvious to those skilled in the art. For example, I might use both meters to indicate candlepower, in which case the total candlepower would be the sum of the two readings. Also, I might use only two cells for my aiming device, mounting them on a turntable to permit using them on two different axes 90° apart. In this case, the cells would be used on a horizontal axis, i. e., side by side, to set the headlight with reference to lateral aim; and they would be used on a vertical axis, i. e., one above the other, to aim the beam with reference to a horizontal plane. Another modification would be to omit either the condensing lens or the screen, or both.

Other changes and modifications of my invention will be apparent to those skilled in the art, but I aim to cover all modifications within the scope of my invention in the appended claims.

I claim:

1. In an aiming device for vehicle headlights, a photoelectric cell having four sections disposed about horizontal and vertical axes of symmetry, a circuit having the two sections on the horizontal axis connected in opposition to each other, a second circuit having the remaining two sections connected in opposition to each other, means in each circuit for balancing the circuit when light beams whose intensities have a predetermined desired ratio fall on the opposed sections, and means in each circuit to indicate an unbalance in the circuit when light beams whose intensities have a ratio different from the desired one fall on the opposed sections.

2. In an aiming device for vehicle lamps, photo-sensitive means in four sections adapted to be positioned along the principal axis of the beam of a lamp, said four sections being disposed about horizontal and vertical axes of symmetry, an opaque screen having openings to admit light to each of said sections, means for mounting the screen and photo-sensitive means in front of a vehicle lamp, a circuit having the two sections on the horizontal axis connected in opposition to each other, a second circuit having the remaining two sections connected in opposition to each other, means in each circuit including a resistance for balancing the circuit to zero current flow when light beams whose intensities have a predetermined desired ratio impinge on the opposed sections, and metering means in each circuit to indicate current flow through the circuit when light beams whose intensities have a ratio different from the desired one impinge on the opposed sections.

3. A headlight testing device comprising a circuit including a pair of photoelectric cells connected in electrically opposed relation, means for casting a light pattern on the cells comprising a condensing lens and a screen having light admitting openings therein, said lens and screen adapted to be positioned along the principal axis of a headlight beam, means in the circuit including a resistance for balancing the voltages of the cells to obtain substantially zero current flow in the circuit when light beams whose intensities have a predetermined desired ratio fall on the cells, a meter in the circuit to indicate current flow through the circuit when light beams whose intensities have a ratio different from the desired one fall on the cells, and means in the aforesaid circuit including switches to connect both cells in series with the meter to permit a determination of the total light value of the patterns falling on the cells.

4. In an automobile headlight testing device, a circuit including a pair of photoelectric cells disposed about a horizontal axis of symmetry and connected in electrically opposed relation, a second circuit including another pair of photoelectric cells disposed about a vertical axis of symmetry and connected in electrically opposed relation, a condensing lens and a screen having four openings for directing light patterns on the cells, means in each circuit including a resistance for balancing the opposed voltages of a pair of cells to obtain substantially zero current flow in the circuit when light beams of equal intensity are directed on the cells in the circuit, a meter in each circuit to indicate current flow through the circuit when light beams of unequal intensity are directed on the cells in the circuit, and means including switches to connect all four cells in series circuit relation with one of said meters to permit an evaluation of the total light intensity of the beams directed on all the cells.

5. In a headlight testing device, a support adapted to be positioned in front of a headlight, a test head adjustably mounted on the support, a photoelectric cell in the test head, said cell being divided into two sections, an electric circuit having the two sections connected in opposition to each other, means for balancing the circuit when light beams whose intensities have a predetermined desired ratio fall on the opposed sections, and means to indicate an unbalance in the circuit when light beams whose intensities have a ratio different from the desired one fall on the opposed sections.

THOMAS W. MEEDER.